United States Patent
Hewgill

(10) Patent No.: US 7,128,511 B2
(45) Date of Patent: Oct. 31, 2006

(54) FASTENER

(75) Inventor: John Hewgill, 45 Mariner St., Buffalo, NY (US) 14201

(73) Assignee: John Hewgill, Oakville (CA)

( * ) Notice: Subject to any disclaimer, the term of this patent is extended or adjusted under 35 U.S.C. 154(b) by 0 days.

(21) Appl. No.: 10/157,895

(22) Filed: May 31, 2002

(65) Prior Publication Data

US 2002/0146299 A1 Oct. 10, 2002

Related U.S. Application Data

(63) Continuation-in-part of application No. 09/431,977, filed on Oct. 29, 1999, now abandoned, which is a continuation-in-part of application No. 09/183,640, filed on Oct. 30, 1998, now abandoned.

(51) Int. Cl.
F16B 39/24 (2006.01)
F16B 33/00 (2006.01)

(52) U.S. Cl. .................. 411/149; 411/136; 411/533; 411/161

(58) Field of Classification Search ............... 411/136, 411/149, 150, 147, 533, 160, 161, 187, 188, 411/189
See application file for complete search history.

(56) References Cited

U.S. PATENT DOCUMENTS 625,529 A * 5/1899 Andress
2,754,872 A 7/1956 Poupitch
3,016,248 A 1/1962 Lindberg
3,417,802 A * 12/1968 Oldenkott
4,969,788 A 11/1990 Goiny
4,986,712 A 1/1991 Fultz
5,066,180 A 11/1991 Lang
5,080,545 A 1/1992 McKinlay
5,108,238 A 4/1992 Ewing
5,183,359 A * 2/1993 Barth
5,190,423 A 3/1993 Ewing
5,203,656 A 4/1993 McKinlay
5,314,279 A 5/1994 Ewing
5,409,338 A 4/1995 McKinlay
5,564,875 A * 10/1996 Matthews
5,618,145 A * 4/1997 Kuo
5,626,449 A 5/1997 McKinlay
5,688,091 A 11/1997 McKinlay
6,039,524 A * 3/2000 McKinlay

FOREIGN PATENT DOCUMENTS

| DE | 684466 | 11/1939 |
|----|--------|---------|
| FR | 60759 | 8/1950 |
| GB | 2 343 228 A | 5/2000 |

* cited by examiner

*Primary Examiner*—Flemming Saether
(74) *Attorney, Agent, or Firm*—Ralph A. Dowell; Dowell & Dowell P.C.

(57) ABSTRACT

A fastener has a body and a cage with cam surfaces formed on interengaging components to inhibit relative rotation. In one embodiment a washer is interposed between said surfaces and has oppositely directed faces with cam surfaces formed on them. In a further embodiment, the underside of the cage has serrations formed on it.

33 Claims, 9 Drawing Sheets

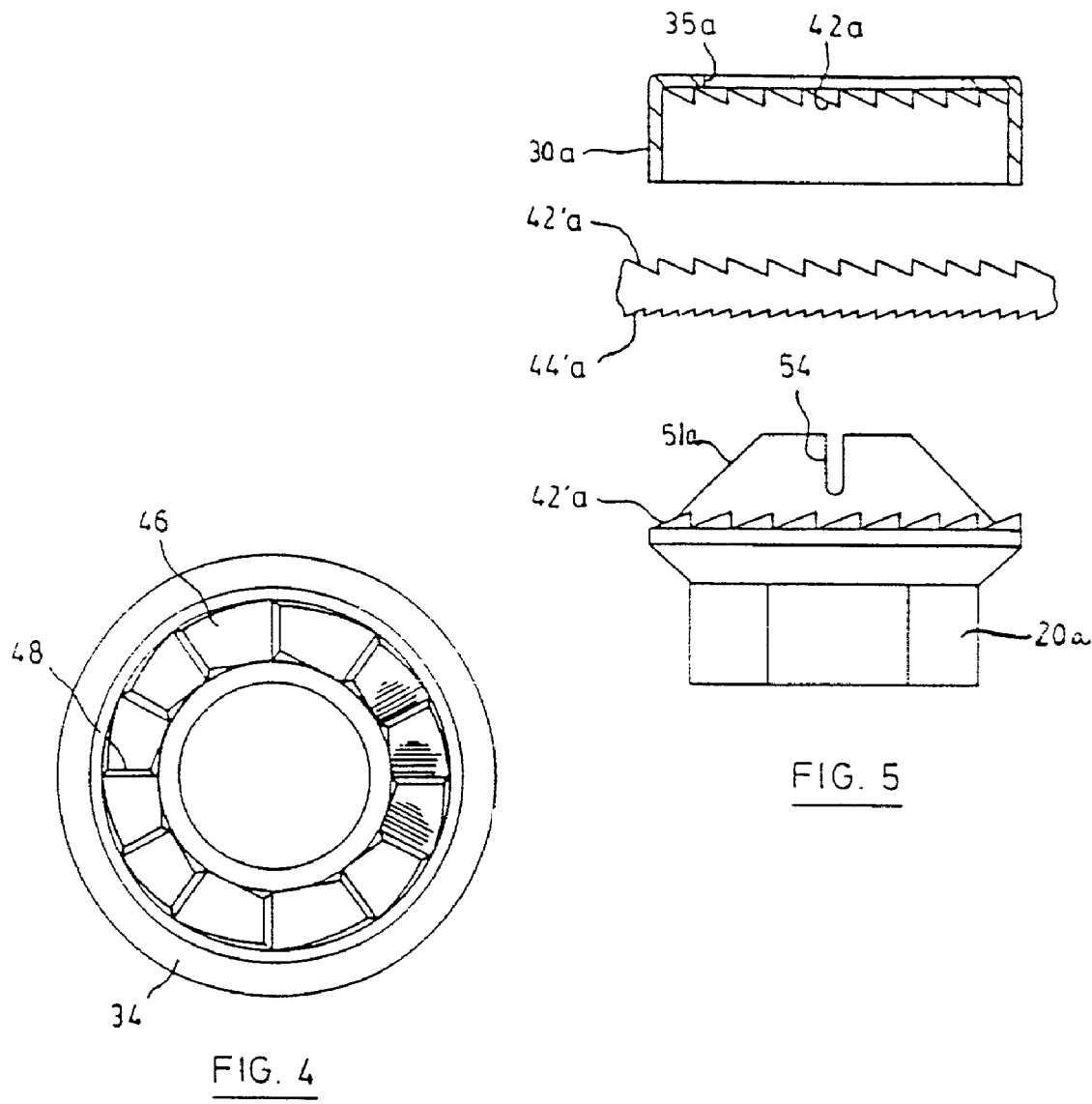
FIG. 5
FIG. 4
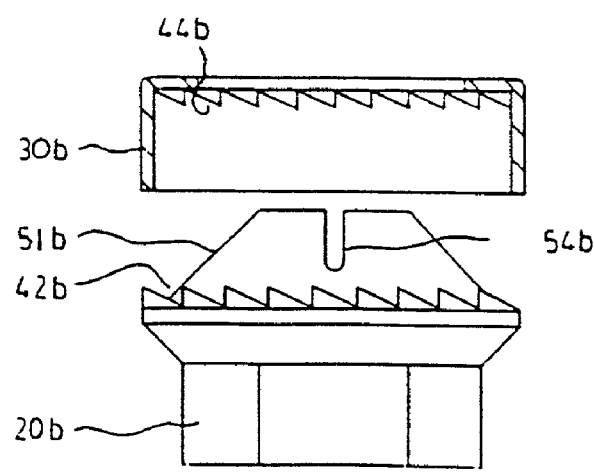
FIG. 6

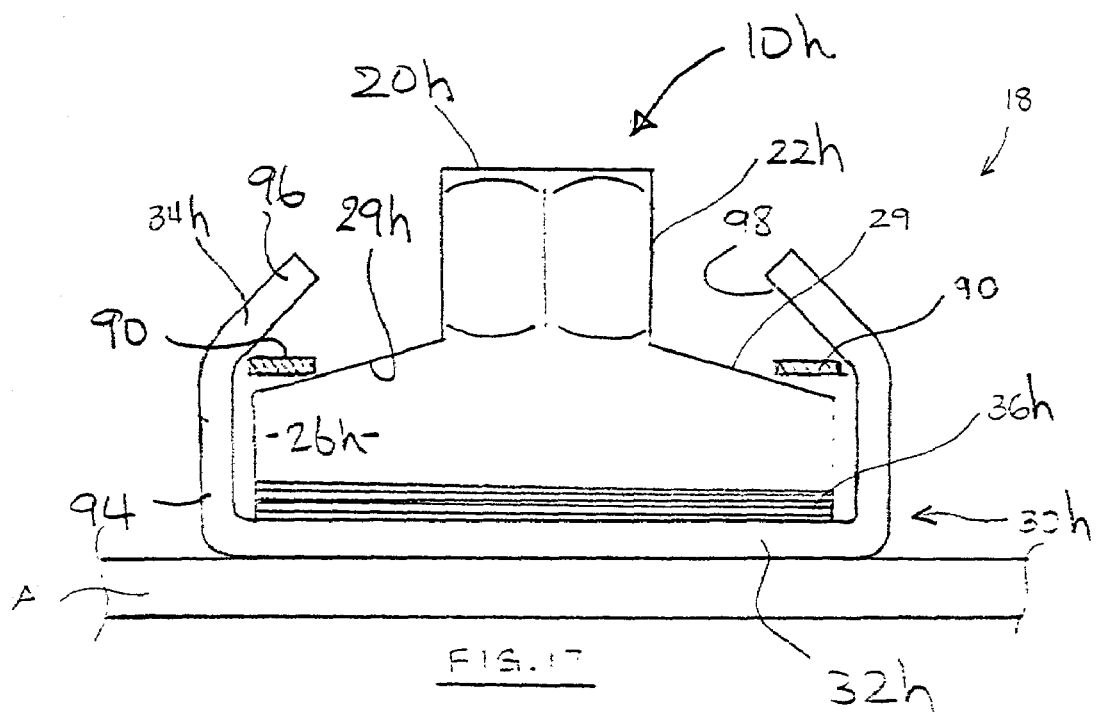

FASTENER

This application is a continuation-in-part of U.S. application Ser. No. 109/431,977 filed Oct. 29, 1999 which is a continuation-in-part of U.S. application Ser. No. 09/183,640 filed Oct. 30, 1998 the contents of which are incorporated herein by reference.

The present invention relates to fasteners.

It is well known to use threaded fasteners to secure components to one another. It is also well known to inhibit separation of the fasteners by providing a vibration resistant washer between the fastener and the component. Typically this would take the form of a spring washer inserted between a face of a nut and a component being clamped.

An alternative form of fastener is shown in U.S. Pat. No. 5,626,449 to Hong Kong Disc Lock Company. In this type of fastener a washer is inserted between the nut and the component and opposed faces of the nut and washer are provided with cam surfaces. The cam surfaces effect axial movement between the washer and the nut upon relative rotation. By arranging for the cam surfaces to have an angle greater than the helix angle of the thread of the nut, unintentional removal of the nut is avoided.

An arrangement shown in U.S. Pat. No. 5,203,656 utilizes a pair of cam surfaces by the provision of an intermediate member between a lower washer and a nut. This is referred to as a three-piece arrangement. However, a disadvantage of the arrangement shown in '656 patent is that a central pilot is used to retain the intermediate component on the nut. The pilot is swaged in situ which leads not only to expensive manufacture but also requires close control of the tolerances to ensure the necessary rotational and axial clearances are provided.

U.S. Pat. No. 5,688,091 to McKinlay discloses a similar type of fastener to that of 5,626,449 in which a cage is used to retain a washer beneath the flared head of a nut. In this arrangement however a cam is provided between the nut and washer. The face between the washer and the cage is planar to provide a single pair of cam surfaces between the washer and nut. The adjacent planar surfaces between the washer and cage allow the washer to rotate as it is tightened. However, it has been found that this arrangement will rotate due to vibration to undo the fastener in the majority of applications.

It is an object to the present invention to obviate or mitigate the above disadvantages.

In general terms the present invention provides a fastener which has a body with an end face and a cage rotatably secured to the body with a planar face directed toward the end face. The sidewalls of the cage extend toward and over the lower portion of the body to permit rotation but inhibit axial separation. A washer is interposed between the body and the cage and has a pair of oppositely directed faces to overlie respective faces on the body and cage. Opposed pairs of faces are provided with complimentary cam surfaces so that relative rotation between the components of the fastener cause axial displacement of the components.

Embodiments of the invention will now be described by way of example only with reference to the accompanying drawings in which:

FIG. 4 is a view on the line IV—IV of FIG. 3.

FIG. 5 is an exploded view of the components in an alternative embodiment of fastener.

FIG. 6 is a view similar to FIG. 5 of a third embodiment of fastener.

FIG. 17 is a sectional view of a further embodiment similar to FIG. 2.

Figure 2:
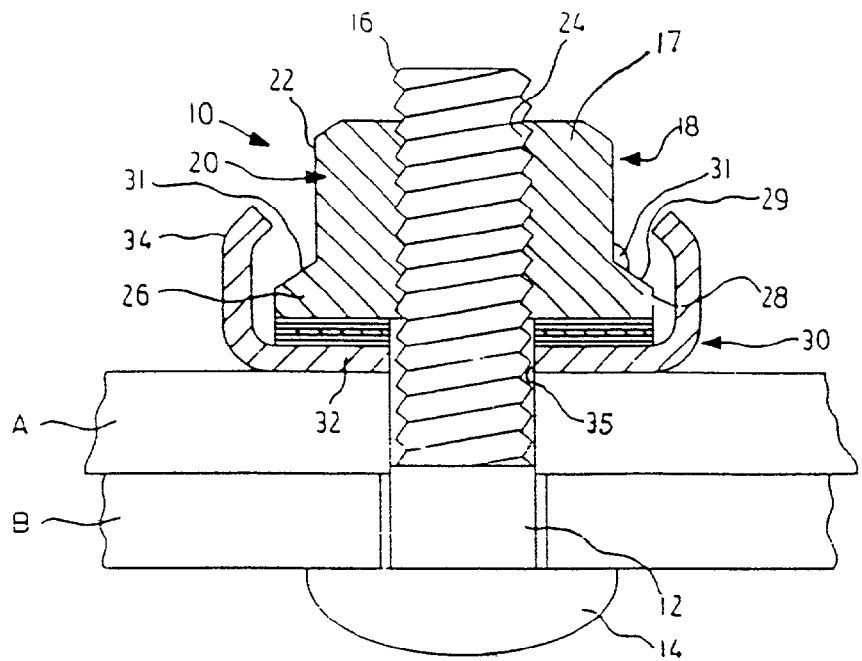
FIG. 2 is a section through a fastener installed between a pair of components.
Figure 1:
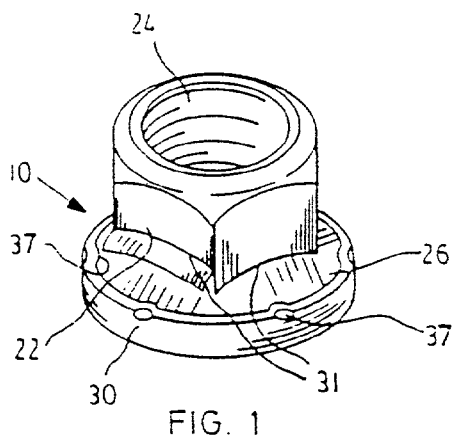
FIG. 1 is a perspective view of a fastener.

In reference to FIGS. 1 and 2, a fastener generally indicated 10 includes a bolt 12 having a head 14.

The bolt 12 includes a threaded shank 16 on which is threaded a nut assembly 18.

The nut assembly includes a body of 20 having planar flats 22, typically arranged as sides of a hexagon, and an internal bore 24 having a thread form corresponding to the shank 16.

The lower end of the body 20 is flared to provide a skirt 26 with a generally planar end face 28. Upper surface 29 of skirt 26 intersects the flats 22 at a radiuses fillet 31 whose height alternates between high and low from flat to flat.

A cage 30 is positioned adjacent the end face 28 and has a bottom wall 32. The bottom wall 32 has an inwardly directed face 33 spaced from the end face 28. A central aperture 35 is provided to receive the bolt 12. A peripheral sidewall 34 extends axially toward and beyond the flared skirt 26.

The cage 30 is heat treated to provide two zones of different physical characteristics with the bottom wall 32 relatively hard and the sidewall 34 more ductile. The upper extremity of the sidewall 34 is locally deformed radially inward to overlie the sloped upper surface of the skirt 26 and limit relative axial movement between the cage 30 and the body 20. The local deformation which is facilitated by the ductility of the sidewall, is provided at six uniformly spaced locations indicated at 37 that provide circumferential abutments as well as radial retention between the cage 30 and body 20.

A washer 36 is interposed between cage 30 and body 20 and has a pair of oppositely directed faces 38, 40 directed toward the end face 28 and inwardly directed face 33 respectively. As can best be seen in FIG. 3, pairs of opposed faces 28, 38 and 33, 40 are formed with complimentary cam surfaces indicated at 42, 42' and 44, 44' respectively.

Figure 3:
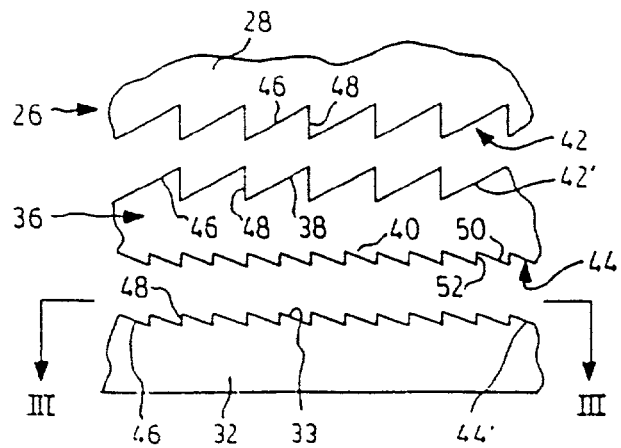
FIG. 3 is an enlarged view of a portion of the fastener shown in FIG. 1.

Referring to FIGS. 2 and 3, the cam surfaces 42, 42' each includes a series of planar facets 46 inclined to a radial plane and uniformly distributed about the longitudinal axis of the bolt 12. The facets 46 are parallel to one another to provide full face contact. The facets 46 are interconnected by a generally axially extending ridge 48 to provide pairs of opposed toothed surfaces that are parallel to one another. The inclination of the facets 46 is selected to be greater than the helix angle of the thread form 24 so that the axial movement induced by cooperation of the surfaces for a given rotation of the body relative to the fastener is greater than the axial displacement of the body 20 relative to the shank 16. The aggregate height of the ridges 48 for each set of cam surfaces 42, 42' is typically the 1.5 times pitch of the thread to achieve satisfactory locking. The height of each ridge 48 is determined by dividing the aggregate height by the number of facets. The number of facets is selected to be an integral multiple of the number of flats and for the cam surfaces 42, 42' 12 facets is found satisfactory. The height of the ridge 48 will then be 1.5 times the pitch divided by 12.

The cam surfaces 44, 44$^1$ also includes a series of parallel planar facets 50 similar to facets 46 of cam surface 42 but oppositely directed with respect to facets 46. The number of facets 50 is greater than the facets 46, but the aggregate height of ridges 52 that interconnect the facets 50 is similar. Accordingly, the height of each of the ridges 52 is less than that of ridge 48. The cam surfaces 42, 42' are therefore relatively coarse and the cam surfaces 44, 44' relatively fine. Cam surfaces 44 will cooperate when subject to vibration to inhibit relative rotation between the cage 30 and washer 36. This allows the cams 42 to cooperate and prevent loosening of the nut 17.

In a typical embodiment, the 360° circle of coarse and fine cams will each have a total number divisible by the wrenching flats of the nut. For a hexagonal nut therefore, the coarse cam circle will typically consist of twelve cams, for diameters from ½ to 1 ½ inches inclusive and the fine cam circle will consist of 18 cams.

The radial extent of the cams measured from the inner edge of the bore will range from 5 mm to 8 mm depending on the bolt diameter.

The nut assembly 18 is preassembled by inserting the washer 36 into the cage 30 and the body 20 placed on the washer 36. The sidewalls 34 are then radially displaced to overlap the upper surface 29 of flared skirt 26. The ductility of the sidewalls facilitates the displacement while permitting lower face to retain the hardened bearing surface. Preferably, the number of locations where the sidewalls are radially displaced will be similar to the number of wrenching flats on the nut although this may be varied to be either greater or lesser depending on circumstances. Limited axial displacement is provided between the cage 30 and the body 20 allowing the cage 30 to rotate relative to body 20. It has been found that the greater height and added hoop strength available at the nut flange provides 30% more strength than a standard nut.

To fasten a pair of components indicated (A) and (B) in FIG. 2, the bolt 12 is passed through an aligned aperture in the two components and the nut assembly 18 threaded onto the shank 16. As the lower face of the cage 30 engages the upper surface of component (A), the cam surfaces 42, 42' and 44, 42' are brought into engagement to rotate the washer 36 cage 30 and body 20 conjointly. The ridges 48 provide torque transmission between the body 20 washer 36 and cage 30 and because of the generally axial disposition of the ridges 48, relative axial separation is not induced.

Figure 12:
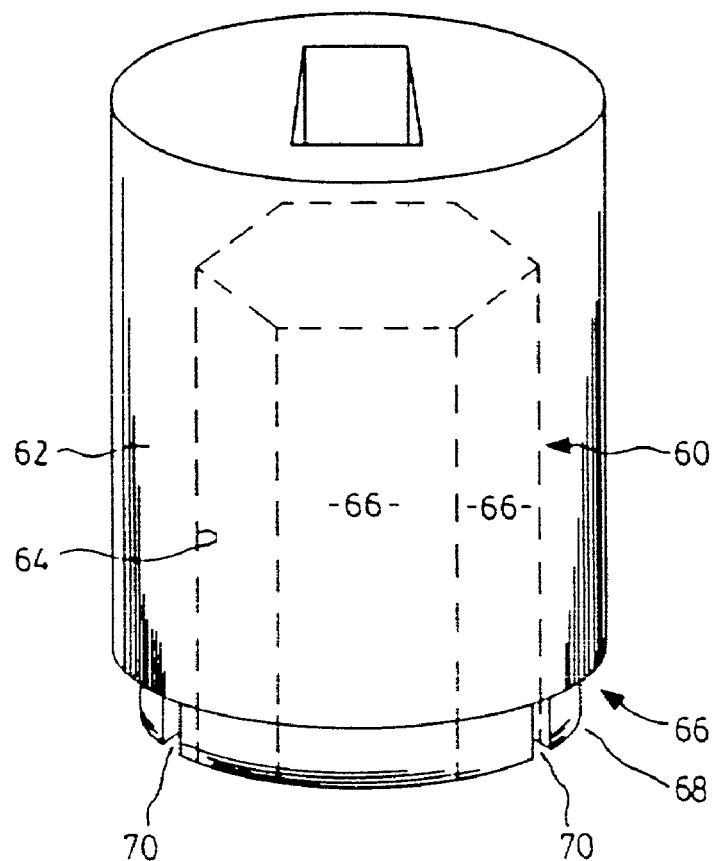
FIG. 12 is a perspective view of a tool used to apply and remove the fasteners shown in FIG. 1.
Figure 13:
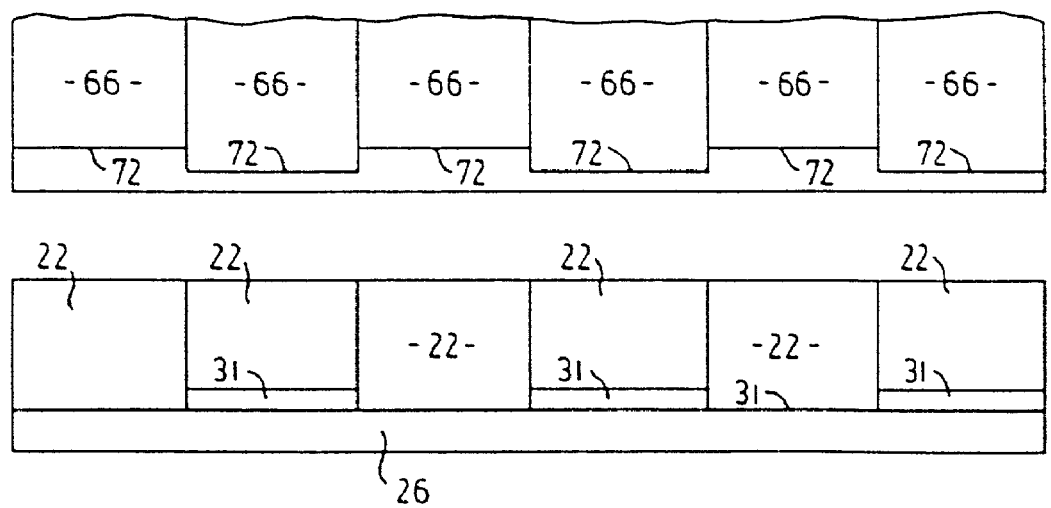
FIG. 13 is a developed view of the lower end of the tool of FIG. 1 and fastener.

The nut assembly 18 is tightened to the requisite torque to hold the two components (A) and (B) by the tool 60 shown in FIGS. 12 and 13.

Referring therefore to FIG. 12, the tool 60 includes a cylindrical barrel 62 that may be connected to a conventional rotary drive and an internal socket 64. The socket has internal faces 66 corresponding to the flats 22 so as to be a snug fit over the body 20.

A rabbet 66 is formed at the lower end of the barrel 62 and is dimensioned to permit the lower end of barrel 62 to fit within the sidewalls 34 of the cage 30. The axial wall 68 of rabbet 66 has recesses 70 which correspond in size and spacing to the local deformations 37.

As shown in FIG. 13, the lower end 72 of the faces 66 are staggered to alternate between "low" and "high" with the stagger corresponding to the change of height of the fillets 31. The height difference of the fillets is chosen to be greater than the axial extent of recesses 70 so that when a 'high' end 72 is engaged with an elevated fillet 31, the recess 70 does not engage the deformations 37.

In this position, as shown in FIG. 13, the body 20 may rotate freely relative to the cage 30 and allow the nut to be tightened.

If in use the bolt 12 extends due to the axial loads placed upon it, relative rotation between cage 30 and body 20 will cause the ridges 48 to engage and the facets 46 of opposed faces to slide across one another. This induces an axial displacement between the faces, which is greater than the axial displacement provided by a corresponding rotation of the body 20 on the shank 16. As such a binding or interference is provided between the components and an unintentional separation is inhibited.

To remove the nut assembly 18, the tool 60 is used but with the "high" lower ends 72 aligned with the lower fillets 31. In this position, the recess 70 may engage the local deformations 37 and transmit torque to them. The body 20 and cage 30 may then be rotated conjointly and removed from the bolt. The recess 70 and deformation 37 will be brought into alignment, upon initial rotation of the body 20. Such rotation will be accommodated by relative movement of the cam surfaces, 42, 44.

An alternative embodiment is shown in FIG. 5 in which like components will be identified by like reference numerals with a suffix (a) added for clarity. In the embodiment of FIG. 5, the body 20 is formed with a conical protrusion 51 which passes through an enlarged bore 35a and cage 30a. The conical protrusion 51 has a pair of axial slots 54 that provide cleaning edges for the thread on the shank 16A. The conical protrusion permits centering of the component A on the fastener in the conventional manner.

A further embodiment is shown in FIG. 6 in which like components will be identified with like reference numerals with a suffix "b" added for clarity. In the embodiments shown in FIG. 6, a conical protrusion 51b is provided with slots 54b. The washer 36 is omitted to provide a two piece assembly with the cam surface 42b on the body 20b engaging with the cam surface 44b on the cage 30b.

In each of the embodiments of FIGS. 5 and 6 the axial slots 54b may be omitted if preferred.

Figure 7:
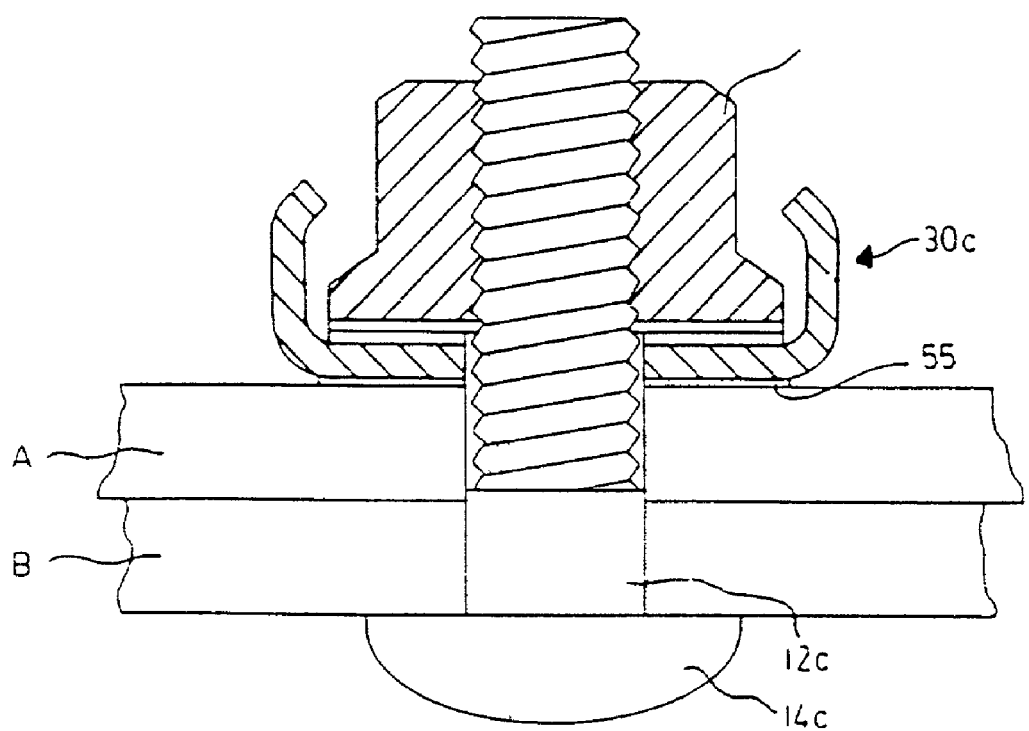
FIG. 7 is a section of a further embodiment fastener.
Figure 8:
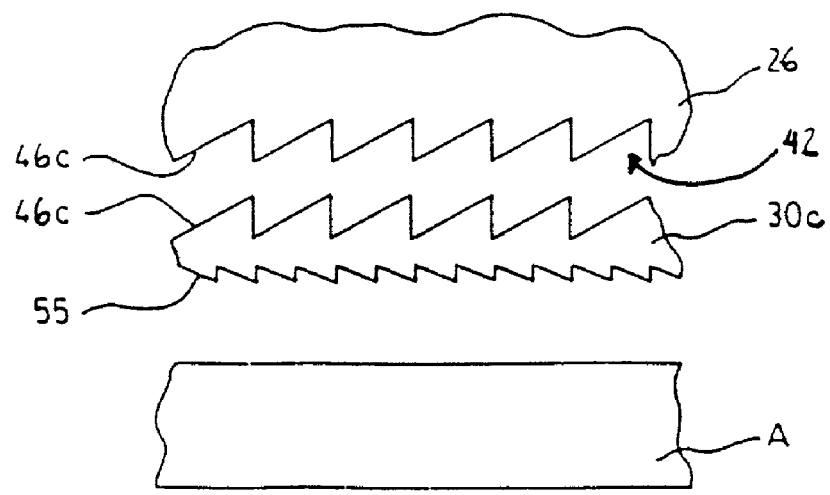
FIG. 8 is an enlarged exploded view of portions of the fastener shown in FIG. 7.

The arrangement depicted in FIGS. 1 to 3 is referred to as a three-piece arrangement because it includes the nut 17, washer 36 and cage 30. A two piece arrangement may also be produced, as shown in FIGS. 7 and 8 wherein the washer 36 is eliminated so that the cam surface 42 of nut 17 and the cam surface 44 on inside bottom surface of the cage 30 engage. Each are produced with oppositely directed coarse cams which are complementary to each other.

Figure 14:
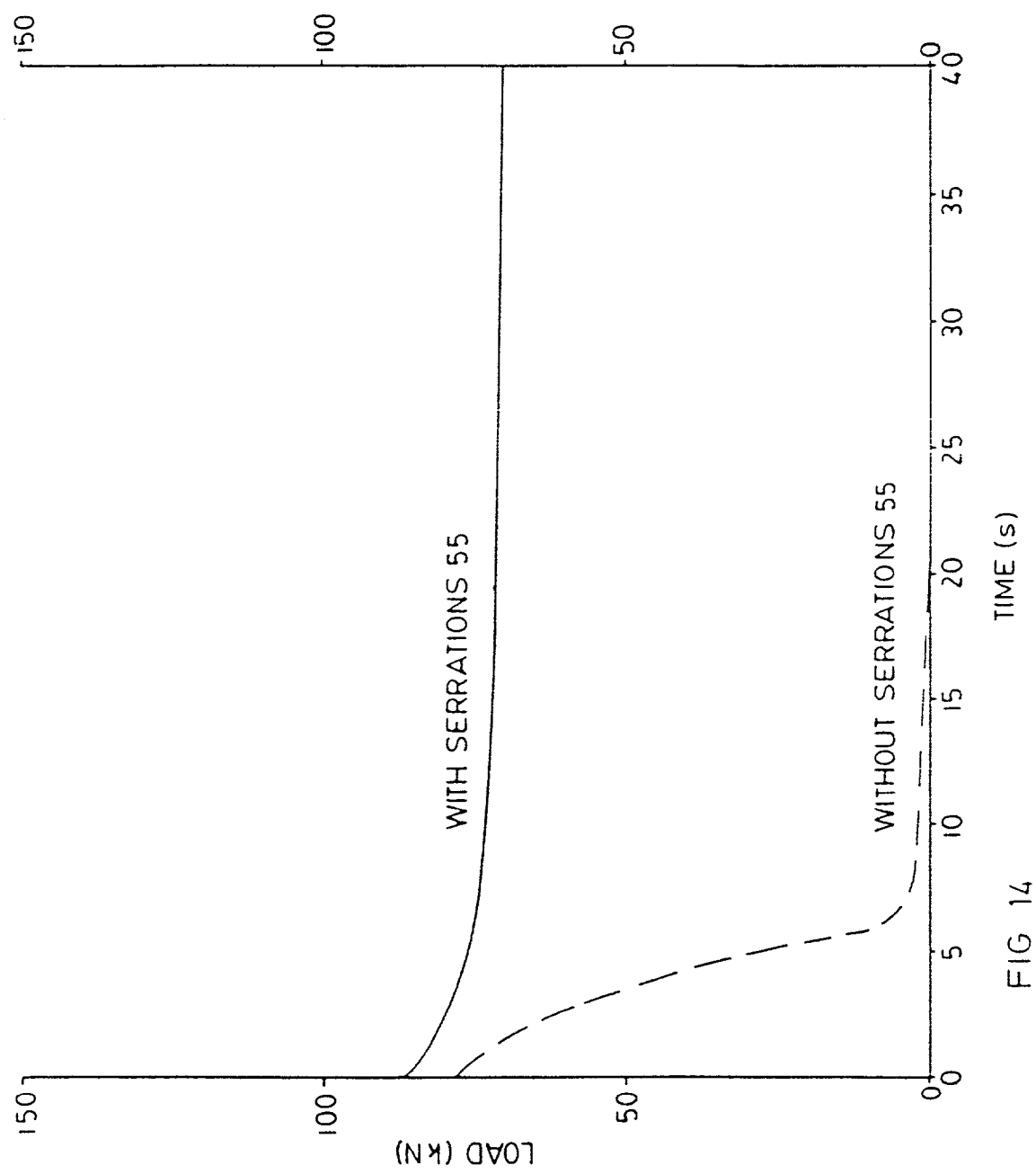
FIG. 14 is a curve showing the relative performance of the fastener of FIG. 7 in vibration testing.

In this case, the cage 30c has fine serrations 55, angled at 15° with respect to a radial plane on the outside bottom of the cage 30c. The serrations 55 are directed oppositely to the facets 46c that are located on the inside bottom of the cage 30c. The serrations 55 engage with the workpiece (A) and stop the cage 30c from moving, thus allowing the coarse cams to move up the incline and lock the nut 17. The effect of the serrations 55 may be seen from FIG. 14. A pair of similar nut assemblies, one with serrations 55 and one without serrations, was tested on a Junker vibration testing machine. The tensile force was monitored over a period of time. As can be seen in FIG. 14, the nut assembly without the serrations lost the tensile force in a relatively short time, indicating slippage of the nut on the bolt. By contrast, the nut assembly with serrations maintained the tensile load, indicating the effectiveness of the serrations in inhibiting rotation of the cage on the workpiece.

In each of the above embodiments a hexagonal body has been illustrated but it will be recognized that other forms of nut may be used such as barrel nuts with longitudinal grooves or other commonly available forms.

Figure 9:
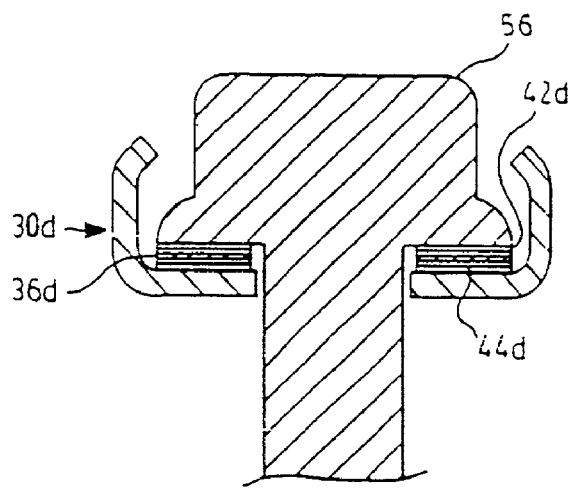
FIG. 9 is a section of a further embodiment of fastener.

In a further embodiment, shown in FIG. 9, coarse cams are formed underneath the flange of a head of a bolt 56. The bolt 56 essentially replaces the nut 17 in the three-piece arrangement of FIGS. 1 and 2 with a washer 36d interposed between the cam surface 42d and cage 30d arranged as described with respect to FIGS. 2 and 3 above. As with the nut 17, the flange bolt 56 can also be used in a 2-piece arrangement. In such an arrangement, coarse cams 42d would be located on the underside of the flange bolt 56 in order to engage oppositely directed coarse cams 44d that are located on the inside of the bottom surface of the cage.

Figure 10:
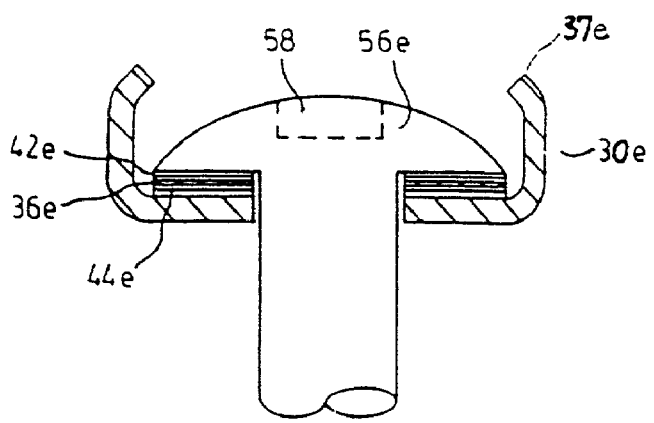
FIG. 10 is an embodiment similar to FIG. 9 of an alternative fastener configuration.

The arrangement shown in FIG. 9 may also be utilized with other forms of bolt head such as domed heads or socket headed bolts. Thus is shown in FIG. 10, a cage 30e is retained on a domed body 56e with local deformations 37e. The body 56e has a socket 58 formed at a central location to receive a hexagonal wrench key.

A washer 36e is interposed between the cage 30e and underside of body 56e to provide a pair of cam surfaces 42e, 44e as described above.

Figure 11:
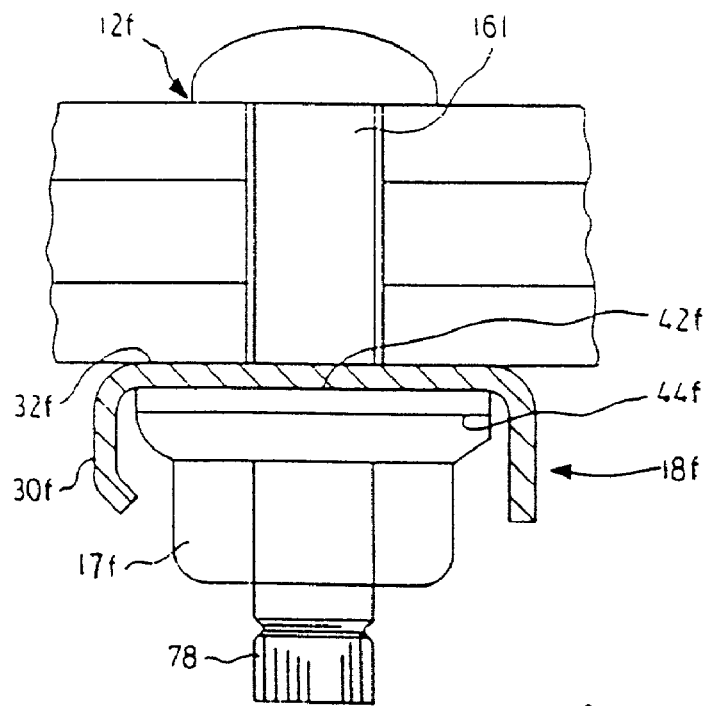
FIG. 11 is an embodiment of a fastener with a shearable shank.

The fasteners shown above may also be used with other fastening systems such as tension control bolting systems shown in FIG. 11. With such a system, the shank 16f is formed with a splined tip 78 and torque applied between the tip 78 and nut 17f to tighten the nut on the bolt 12f. As illustrated in FIG. 11, the nut assembly 18f has a form similar to that shown in FIG. 2 above and therefore acts as a self-locking assembly. Upon application of the design torque to the nut 17f, the tip 78 shears from the shank 16f to inhibit further tightening. Subsequent removal can be accomplished as noted above.

The use of the nut assembly 18f inhibits rotation of the nut 17f under vibration and therefore maintains the loading on the bolt 12f. To ensure accurate loading of the bolt 12f it is desirable that the area of the abutting nut and washer is 50% or less than the area of the end face 32f of cage 30f. This may readily be attained using the cam surfaces and lubrication provided between the cam surfaces to reduce frictional resistance during tightening.

In a typical application for a ¾ inch (19 mm) bolt diameter the end face 32f has an outside diameter of approximately 47-mm and a bolt hole clearance of approximately 24 mm. The annulus in contact with the object is therefore 23 mm wide.

In this embodiment, the cam surfaces 42f, 44f have a radial extent of approximately 6 mm. and so the ratio of areas is approximately 40% of the end face 32f.

Figure 15:
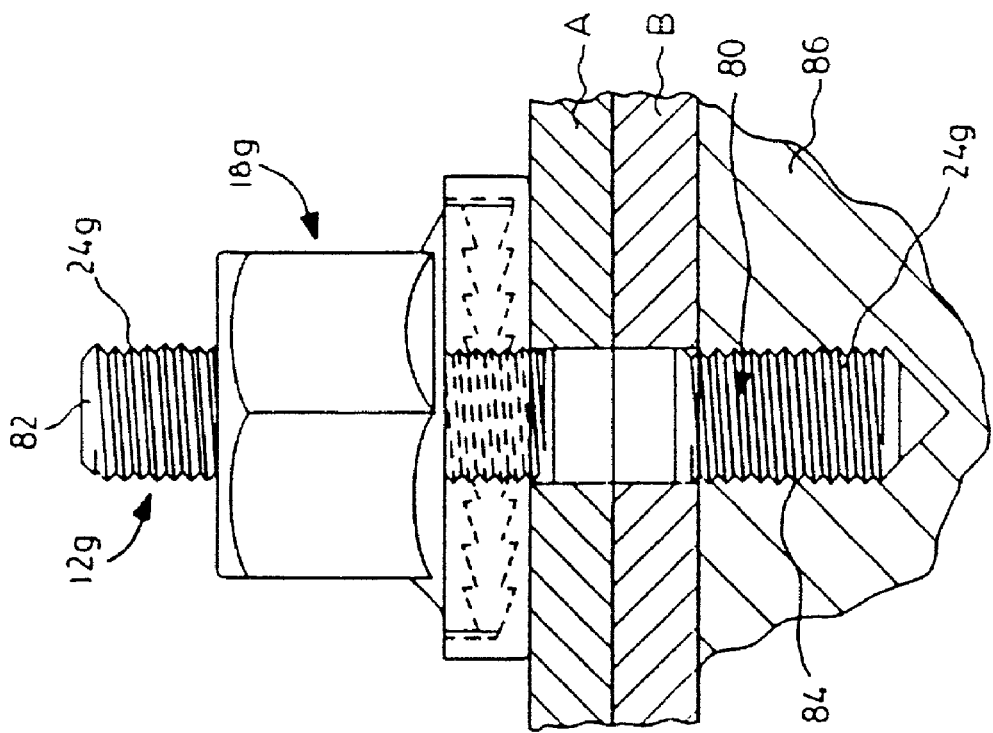
FIG. 15 is a sectional view of the fastener of FIG. 2 utilised with a stud.
Figure 19:
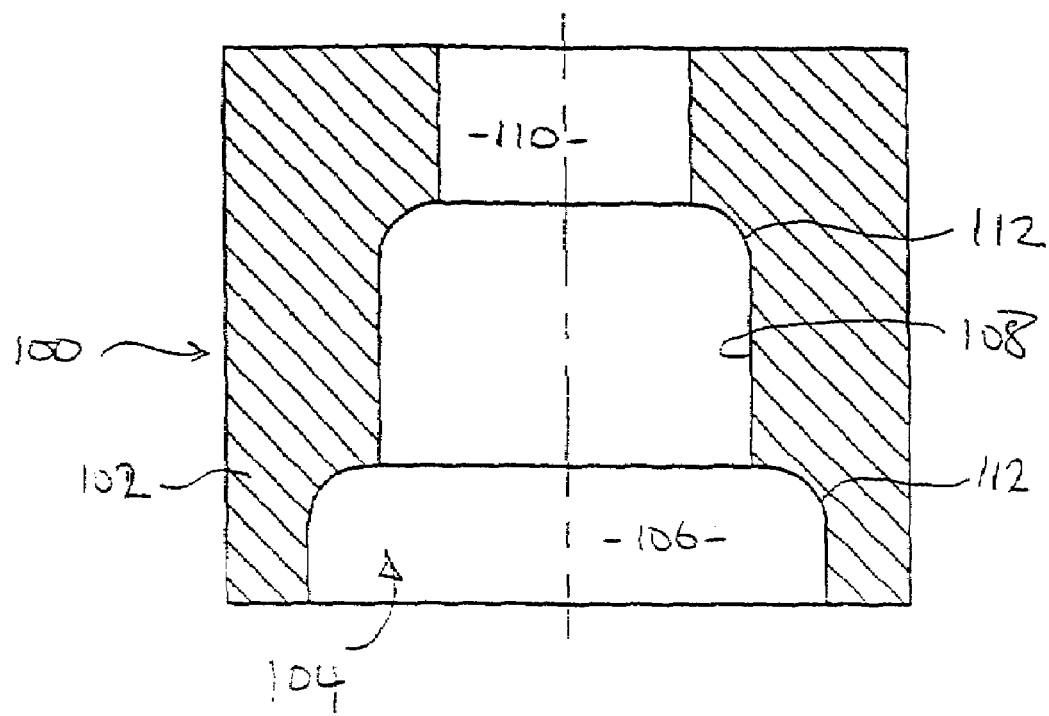
FIG. 19 is a section through a tool used to form the embodiment of FIG. 17.

The nut assembly of FIG. 1 though 7 may also be used advantageously with studs secured in a blind hole. As shown in FIG. 15, a nut assembly 18g, similar to that shown in FIGS. 1 to 4, is threaded on a stud 12g. The stud 12g has a pair of threads 24g at opposite ends 80,82, which may be of opposite hand, or the same hand, or of different form to suit the particular applications. One end, 80, is received in a blind bore 84 in a support structure 86. The bore 84 is threaded with a complementary thread to the 80 so that the stud may be threaded in.

The stud is installed by threading the nut assembly 18g onto the opposite end and driving the stud 12g into the blind bore 84. The nut 17g is then torqued against the components A, B to be held on the support structure 86. The nut assembly 18g will then hold the stud 12g under tension and retain it in the bore 84.

Figure 16:
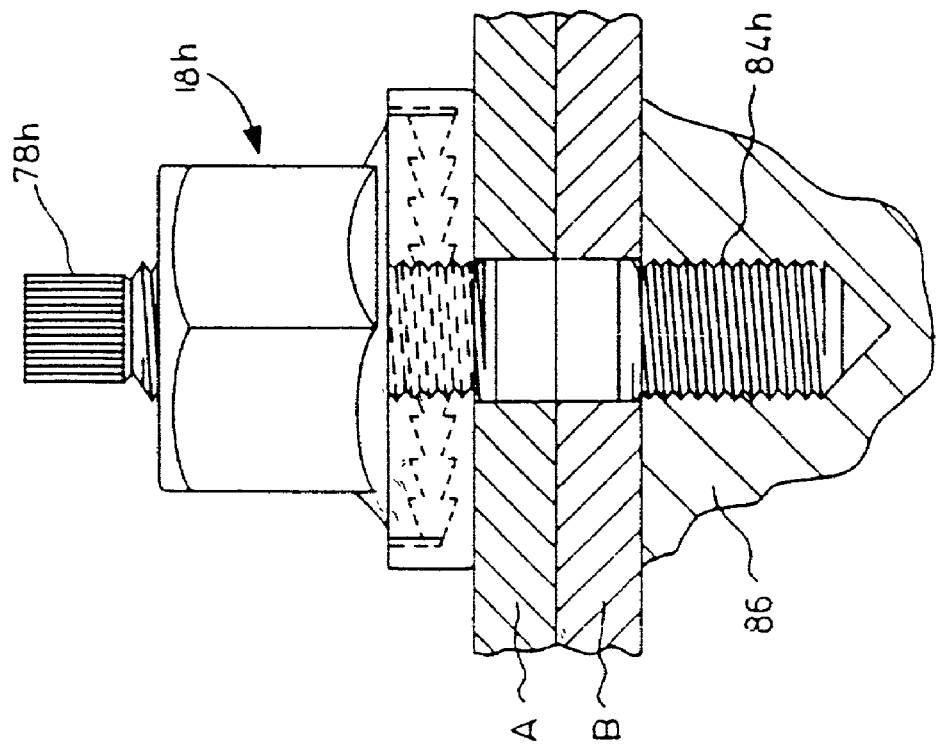
FIG. 16 is a view similar to FIG. 15 of an alternative embodiment of stud.

The arrangement of stud shown in FIG. 15 is particularly beneficial when used with a tension control splined tip similar to that shown in FIG. 11. Referring to FIG. 16, the splined tip 78h is formed on the end 80h and can be used to drive the stud 12h into the blind bore 84h and subsequently controls the torque applied to the nut assembly 8h. The nut assembly of the embodiment of FIG. 7 may also be used with the stud arrangement show in FIGS. 15 and 16 with serrations 55 providing the enchanced retention of the nut assembly.

In certain configurations it has been found that there is sufficient elasticity in the threaded shank 16 to allow the nut 18 to be undone by driving it over the facets 46. To avoid this a further embodiment is shown in FIG. 17 of a fastener having a three-piece arrangement similar to that shown in FIGS. 1 to 3. Like reference numerals will be used to identify like components with a suffix "h" added for clarity. In the embodiment shown in FIG. 17, the peripheral sidewall 34h of the cage 30h is formed with a lower cylindrical portion 94 and an upper frustoconical portion 96. A circlip 90 is located within the cage 30h between the upper inclined surface 29h of flared skirt 26h and the inwardly directed inclined surface 98 of frusto-conical portion 96. Circlip 90 is typically a flat band, having a "C" configuration to allow flexure to reduce the diameter of the circlip 90.

Circlip 90 is dimensioned to limit the axial displacement available between cage 30h and body 20h of nut assembly 18h. As can be seen in FIG. 17, the circlip 90 is positioned adjacent the transition between the portions 94,96 of the sidewall 34h so that relative axial movement of the body 20h away from bottom wall 32h will attempt to reduce the diameter of the circlip 90. The fastener 10h is assembled by inserting washer 36h into cage 30h, the body 20h then being placed on washer 36. In the preferred assemblage, circlip 90 is then placed on body 20h and the sidewall 34h of cage 30h is then radially inwardly displaced to overlap the upper surface 29h of flared skirt 26h.

In the alternative, circlip 90 may be introduced into cage 30h after the sidewalls 34h have been radially displaced. In this case, on assembly of the fastener, the ends of circlip 90 are compressed toward one another decreasing the radius of the circlip for installation within cage 30h. When the ends are released, circlip 90 expands, the tensioned band returning to the original configuration, and is retained within cage 30h.

Upon application of a reverse torque to the fastener 10h, opposed camming surfaces provided by the facets 46h of washer 36h and end face 28h of body 20h slide relative to one another as described in FIG. 3 to induce a relative axial displacement. The upper surface 29h engages with the circlip 90 to limit the axial displacement and thereby relative rotation. Further rotation requires displacement of the circlip 90 relative to the cage 34h which is inhibited by the compressive and friction forces. The comical portion 96 requires a progressive compression of the circlip 90, as it is axially displaced, thereby presenting a progressively increasing force. The circlip 90 provides an abutment that limits the axial displacement to a height less than that of the ridge 48h. The force required to cause further elongation of the shank 16h is thus dramatically increased to inhibit removal of the nut assembly 18h. In the preferred embodiment the allowable axial displacement is limited by the circlip 90 to one fourth the height of the ridges 48h.

The circlip 90 is intended to prevent the removal of the fastener once installed. In the event, that removal of the fastener is desired, circlip 90 is removed from the cage 30h by circlip pliers, and the fastener 10h is removed as previously described. Upon reassembly the circlip may be replaced or, preferably a new nut assembly is utilised.

A two-piece fastener arrangement may also be produced, though not shown, wherein washer 36 is eliminated such that the cam surface 42 of nut 17 and cam surface 44 on the inside bottom surface of cage 30 engage. Each of these cam surfaces is produced with oppositely directed course cams which are complementary to one another. The circlip 90 is located between the cage 30 and flared skirt 26 as described above. The provision of circlip 90 causes body 20 and washer 26 to remain in a substantially fixed relationship within cage 30 as circlip 90 limits the potential axial displacement of same. If required, the serration's may be provided on the lower face of the cage as described with reference to FIG. 7 and 8.

Figure 18:
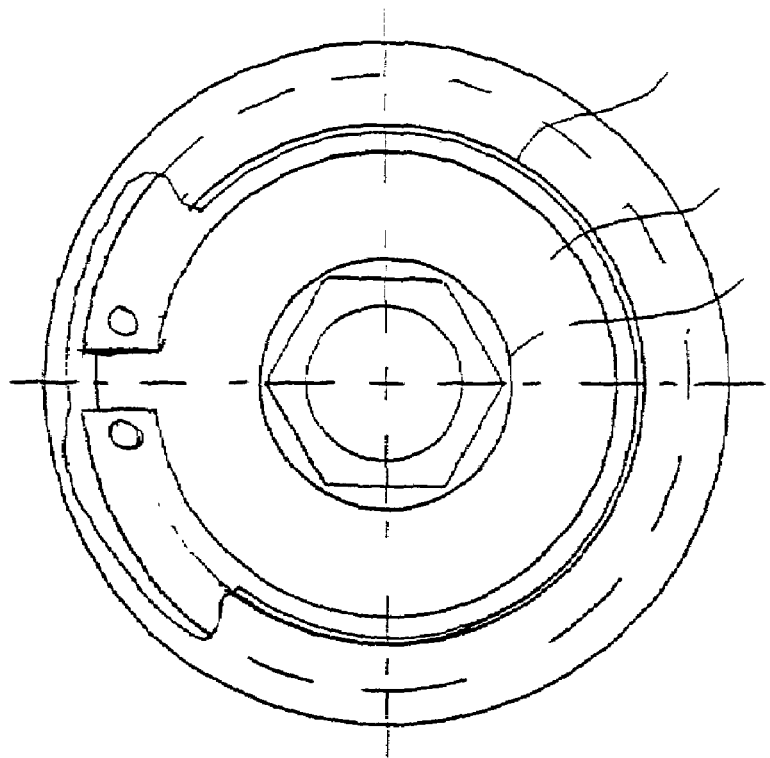
FIG. 18 is a plan view of FIG. 17 with portions thereof sectioned for clarity.

The nut assembly 18 detailed in FIG. 17 has frusto conical upper portions 96 of sidewalls 34h which may be formed using the tool 100 shown in FIG. 18. The tool 100 includes a cylindrical barrel 102 with an internal cavity 104. The cavity 104 is formed by three counterbores 106, 108, 110. The counterbores 106, 108, 110 are arranged in a step-like and interconnected by radiussed fillet 112, 114 respectively. The outermost bore 106 is dimensioned to correspond to the diameter of the lower cylindrical portion 94 of cage 30 so that the undeformed peripheral wall 34 is a snug fit within the counterbore. The counterbores 108,110 are adapted to receive the nut 22 and shank 16 respectively in a freely fitting manner.

To radially displace the sidewalls 34 of cage 30 and form the frust-conical portion 96, tool 100 is placed over the top outer edges of cage 30 so as to receive the peripheral portion in the counterbore 106 with the washer 36h, body 20h and circlip 90 located within the cage 30. On application of downward force on tool 100, the upper edge of the sidewall 34 is forced into the radiused fillet 112 and deflected inwardly in a uniform manner. This uniform application of force by tool 100 avoids the formation of local deformations as in the previously described embodiments, and enables a continuous fold in the cage material.

Tool 100 may be used in combination with fasteners having a variety of different diameters and the radius adjusted to provide the required deflection.

It will be seen therefore that a simple yet effective fastener has been described that provides the requisite resistance to vibration and at the same time is relatively easy to manufacture.

The invention claimed is:

1. A fastener comprising a body with a thread formed thereon, said body having an end face, a cage rotatably secured to said body and having a radial face directed toward said end face and side walls extending toward and overlying a portion of said body to inhibit axial separation, and a flat washer interposed between said body and said cage, said washer having an inner periphery and an outer periphery with a pair of oppositely directed radial faces extending between said inner and outer peripheries, one of said faces being directed toward said end face of said body and the other of said faces being directed toward said radial face of said cage, opposed pairs of said faces abutting over substantially the entire radial extent thereof upon initial engagement, said faces having complementary cam surfaces formed thereon between said inner periphery and said outer periphery to induce relative axial movement upon rotation between said faces, said cam surfaces including a plurality of inclined facets having an angle of inclination greater than the helix angle of said thread.

2. A fastener according to claim 1 wherein said body has a flared skirt adjacent said radial face and said side walls overlap said skirt.

3. A fastener according to claim 1 wherein said body is a nut having planar flanks to permit torque transmission thereto.

4. A fastener according to claim 3 wherein selected ones of said flanks have an abutment to inhibit movement of a tool axially along said flanks toward said cage.

5. A fastener according to claim 1 wherein said facets are interconnected by ridges to provide a torque-transmitting abutment between said faces.

6. A fastener according to claim 1 wherein said cam surfaces associated with respective ones of said opposed pairs of faces are different.

7. A fastener according to claim 1 wherein said facets associated with one of said pairs of surfaces are of different length to facets associated with the other of said pairs of surfaces.

8. A fastener according to claim 1 wherein said body has a plurality of flats formed thereon to define a polygonal body and the number of said facets is an integral multiple of the number of flats.

9. A fastener according to claim 1 wherein said body has a threaded shank depending therefrom.

10. A fastener according to claim 1 wherein said facets are inclined at an angle up to 1.5 times that of said helix angle of said thread.

11. A fastener assembly for securing a pair of components to one another, said fastener assembly including a bolt having a head with a first end face directed toward one of said components and a threaded shank depending from said head, a nut having a body and a second end face directed toward another of said components, said body being threaded to receive said shank, a cage secured to one of said head and said body and having a radial face extending across a respective one of said end faces, and a flat washer interposed between said cage and said end face, said washer having an inner periphery and an outer periphery with a pair of oppositely directed radial faces extending between said inner periphery and said outer periphery, and one of said face being directed toward said one end face and the other of said faces being directed toward said radial face of said cage, opposed pairs of said faces lying in a plane generally perpendicular to a longitudinal axis of said body and abutting over substantially the entire radial extent thereof upon initial engagement, said faces having complementary cam surfaces formed thereon to induce relative axial movement upon rotation between said faces, said cam surfaces including a plurality of inclined facets having an angle of inclination greater than the helix angle of said threaded shank.

12. A fastener assembly according to claim 11 wherein said shank has a splined tip at the opposite end to said head, said tip being severable upon application of a predetermined torque to said nut.

13. A fastener assembly according to claim 11 wherein said one end face is a said nut.

14. A fastener assembly according to claim 11 wherein said one end face is a said head.

15. A fastener assembly according to claim 14 wherein said head is polygonal.

16. A fastener assembly according to claim 14 wherein said head is domed.

17. A fastener according to claim 11 wherein said facets are inclined at an angle up to 1.5 times that of said helix angle of said thread.

18. A fastener comprising a body having an end face, a cage rotatably secured to said body and having a radial face directed toward said end face and side walls extending toward and overlying a portion of said body, said radial face and said end face being interconnected by cam surfaces formed thereon and operable to induce relative axial movement upon relative rotation between said faces, and an abutment member formed as a separate piece and removably secured between said cage and said body to limit axial separation therebetween.

19. A fastener according to claim 18 wherein a washer is interposed between said body and said cage, said washer having a pair of oppositely directed faces, one of which is directed toward said end face of said body and the other of which is directed toward said radial face of said cage, opposed faces of said fastener having complementary cam surfaces thereon to induce relative axial movement between said body and said cage.

20. A fastener according to claim 19 wherein said abutment is resilient to facilitate insertion between said cage and said body.

21. A fastener according to claim 20 wherein said cage has an inclined wall extending across but spaced from said body and said abutment is removably secured between said inclined wall and said body.

22. A fastener according to claim 21 wherein said body has a flared skirt and said side walls overlap said skirt.

23. A fastener according to claim 22 wherein said flared skirt is surmounted by a nut having planar flanks to permit torque transmission thereto.

24. A fastener according to claim 22 wherein said cam surfaces associated with respective ones of said opposed pairs of faces are different.

25. A fastener according to claim 21 wherein said complementary cam surfaces include a plurality of facets inclined to a radial plane and interconnected by ridges to provide a torque-transmitting abutment between said faces.

26. A fastener assembly for securing a pair of components to one another, said fastener assembly including a bolt having a head with a first end face directed toward one of said components and a threaded shank depending from said head, a nut having a body and a second end face directed toward another of said components, said body being threaded to receive said shank, a cage secured to one of said head and said body and having a radial face extending across a respective one of said end faces, an abutment member formed as a separate piece and removably secured between said cage and said body and acting to limit relative axial movement therebetween and a washer interposed between said cage and said end face, said washer having a pair of oppositely directed faces, one of which is directed toward said one end face and the other of which is directed toward said radial face of said cage, opposed pairs of said faces having complementary cam surfaces formed thereon to induce axial movement upon relative rotation between said faces.

27. A fastener according to claim 26 wherein a washer is interposed between said body and said cage, said washer having a pair of oppositely directed faces, one of which is directed toward said end face of said body and the other of which is directed toward said radial face of said cage, opposed faces of said fastener having complementary cam surfaces thereon to induce relative axial movement between said body and said cage.

28. A fastener according to claim 27 wherein said abutment is resilient to facilitate insertion between said cage and said body.

29. A fastener according to claim 28 wherein said cage has an inclined wall extending across but spaced from said body and said abutment is removably secured between said inclined wall and said body.

30. A fastener according to claim 29 wherein said body has a flared skirt and said side walls overlap said skirt.

31. A fastener according to claim 30 wherein said flared skirt is surmounted by a nut having planar flanks to permit torque transmission thereto.

32. A fastener according to claim 30 wherein said cam surfaces associated with respective ones of said opposed pairs of faces are different.

33. A fastener according to claim 29 wherein said complementary cam surfaces include a plurality of facets inclined to a radial plane and interconnected by ridges to provide a torque-transmitting abutment between said faces.

* * * * *